United States Patent [19]

Divakaruni

[11] Patent Number: 5,923,286
[45] Date of Patent: Jul. 13, 1999

[54] GPS/IRS GLOBAL POSITION DETERMINATION METHOD AND APPARATUS WITH INTEGRITY LOSS PROVISIONS

[75] Inventor: Sudhakar P. Divakaruni, Scottsdale, Ariz.

[73] Assignee: Honeywell Inc., Minneapolis, Minn.

[21] Appl. No.: 08/735,764

[22] Filed: Oct. 23, 1996

[51] Int. Cl.$^6$ .............................. G01S 5/02; H04B 7/185
[52] U.S. Cl. ......................................... 342/357; 701/213
[58] Field of Search ................................... 342/357, 450, 342/457; 701/213, 214

[56] References Cited

U.S. PATENT DOCUMENTS

| | | | |
|---|---|---|---|
| 4,806,940 | 2/1989 | Harral et al. | 342/451 |
| 5,394,333 | 2/1995 | Kao | 364/450 |
| 5,461,388 | 10/1995 | Applegate et al. | 342/357 |
| 5,504,482 | 4/1996 | Schreder | 340/995 |
| 5,504,492 | 4/1996 | Class et al. | 342/357 |
| 5,512,903 | 4/1996 | Schmidke | 312/357 |
| 5,543,804 | 8/1996 | Buchler et al. | 342/357 |
| 5,583,774 | 12/1996 | Diesel | 364/443 |
| 5,606,506 | 2/1997 | Kyrtsos | 364/449.1 |
| 5,657,025 | 8/1997 | Ebner et al. | 342/357 |

FOREIGN PATENT DOCUMENTS 0 629 877  12/1994  European Pat. Off. .
95 34850   12/1995  WIPO .

OTHER PUBLICATIONS

Article entitled Minimum Operational Performance Standards for Airborne Supplemental Navigation Equipment Using Global Positioning System (GPS), document No. RTCA/DO–208, Jul. 1991, prepared by: SC–159, pp. 19–22.
Appendix F entitled "Least–Squares Residuals RAIM Method" from document No. RTCA/DO–208, Jul. 1991, prepared by SC–159, pp. 1–4.
Article entitled "Implementation of a RAIM Monitor and a GPS Receiver and an Integrated GPS/IRS" by Mats Brenner, in the proceedings of ION GPS–90, Third International Technical Meeting of the Satellite Division of the Institute of Navigation, Sep. 19–21, 1990, located at p. 397.
Patent Abstracts of Japan, vol. 013, No. 135 (p–851), Apr. 5, 1989.

Primary Examiner—Thomas Tarcza
Assistant Examiner—Dao L. Pham
Attorney, Agent, or Firm—Charles J. Ungemach; Ronald E. Champion

[57] ABSTRACT

A system for use with an inertial reference system and a global position receiver for calculating a position error after a loss of integrity by utilizing the global position system values for position and velocity at a time just before the loss of integrity and by utilizing the inertial reference system position modified by the known error in inertial reference system position as it varies with time and the position error as calculated by the global position system velocity extrapolated over the time since integrity loss.

19 Claims, 3 Drawing Sheets

GPS/IRS GLOBAL POSITION DETERMINATION METHOD AND APPARATUS WITH INTEGRITY LOSS PROVISIONS

BACKGROUND OF THE INVENTION

1. Field of the Invention

The present invention pertains to a system employed for determining the global position of a mobile unit by employment of both an inertial reference system (IRS) and a satellite positioning system (GPS), and more specifically, a system which employs a provision for determining the mobile unit's global position and corresponding integrity during those periods of time in which the GPS satellite constellation is insufficient for establishing GPS integrity limit values by employment of RAIM.

2. Description of the Related Art

Satellite positioning systems are now well-known in the art. Such systems, for example, NAVSTAR-GPS, are rapidly being employed for a determination of the geocentric position of mobile units, such as water and land vehicles, space and aircraft, and survey equipment, to name a few.

In aircraft, GPS systems are being utilized for navigation, flight control, and airspace control. These GPS systems may operate independently or in combination with inertial reference systems or attitude heading reference systems in order to provide information particularly during a flight mission.

Global positioning systems, hereinafter referred to as "GPS", similar to NAVSTAR, commonly use a GPS receiver, located on a mobile unit, for receiving satellite information signals transmitted from a plurality of satellites. Each GPS satellite transmits a satellite information signal containing data that allows a user to determine the range or distance between selected GPS satellites and the antenna associated with the mobile unit's GPS receiver. These distances are then used to compute the geocentric position coordinates of the receiver unit using known triangulation techniques. The computed geocentric position coordinates may, in turn, be translated to earth latitude and longitude coordinates.

In order to determine the position of the GPS receiver, a minimum of four unique satellite information signals are required, rather than the expected three (three position, unknown coordinates). This is so, since the GPS receiver generally includes a receiver clock which is not as accurate as the atomic clock normally associated with each of the satellites. Therefore, receiving satellite information signals from four different satellites provides a complete solution which permits the correction of any receiver clock error as is well-understood in the art. Herein, the GPS receiver position derived by the triangulation technique using data from multiple satellites is referred to as the "GPS estimated position", identified as POS_GPS. The accuracy of this estimated GPS position is dependent upon many factors, including, among others, atmospheric conditions, selective satellite availability, and the relevant position of the satellites with respect to the line of sight view of the satellites.

Associated with a GPS estimated position is a "position error bound" as particularly defined by accepted GPS systems standards which have been developed by the Radio Technical Commission for Aeronautics (RTCA), in association with aeronautical organizations of the United States from both government and industry. The RTCA has defined the phrase "GPS system integrity" as the ability of a GPS system to provide timely warnings to users when the GPS system should not be used for navigation. "System integrity" is particularly identified in a document entitled "Minimum Operational Performance Standards for Airborne Supplemental Navigation Equipment Using Global Positioning System (GPS)", document number RTCA/DO-208, July 1991, prepared by: SC-159, beginning at section 1.5. As described therein, GPS is complicated in that it is a four-dimensional system involving three components of position and one time component. As also described in the aforesaid RTCA publication, the signal-in-space error transforms into a horizontal position error via a relatively complex function of a satellite constellation geometry at any given moment. The GPS integrity system must interpret the information it has about the received GPS signals and error terms in terms of the induced horizontal position error, commonly referred to as the "position error bound", and then make a decision as to whether the position error bound is outside the allowable radial error, specified for a particular phase of the flight mission in progress. The allowable error is referred to as the "alarm limit", herein referred to as the "integrity alarm limit". If the horizontal position error bound is found to exceed the integrity alarm limit, a timely warning must be issued by the GPS receiver or subsystem to notify the pilot that the GPS estimated position should not be relied upon.

Two rather distinct methods of assuring GPS integrity have evolved as civilian use of GPS has progressed. One is the Receiver Autonomous Integrity Monitoring (RAIM) concept, and the other is the ground monitoring approach that goes under the "GPS Integrity Channel" (GIC). The intent of both of these methods is the calculation of the position error bound with regard to the current GPS estimated position so that it may be compared with the alarm limit associated with a particular phase of a flight mission.

The receiver autonomous integrity monitoring system (RAIM) employs a self-consistency check among the measurements, more specifically, GPS pseudo range measurements. Satellite redundancy is required to perform a self-consistency check on an instantaneous basis. Thus, five satellites must be in view, i.e., five satellite information signals received and pseudo range measurements calculated by a GPS receiver. If fewer than five satellites are in view, the value of the predicted position error bound will be infinite. Also, constraints are placed on the satellite constellation geometry that must be met if the self-consistency check is to be effective in the presence of noise, e.g., azimuth angle of the satellite relative to user position. Generally, a satellite constellation with many satellites in view permits a robust integrity monitoring system. Conversely, a satellite constellation having only a few satellites in view, may limit the availability of an integrity monitoring system. Thus, there may be short periods when a good consistency check is not possible (less than five satellites in view). The main feature of RAIM is that it is completely self-contained and relatively easy to implement in software.

Examples of RAIM may be found in the aforementioned RTCA publication, Appendix F, and also in an article entitled "Implementation of a RAIM Monitor and a GPS Receiver and an Integrated GPS/IRS" by Mats Brenner, located at page 397, in the proceedings of ION GPS-90, Third International Technical Meeting of the Satellite Division of the Institute of Navigation, Sep. 19–21, 1990.

GPS systems which incorporate RAIM output a position error bound value which represents the probabilistic radial errors of the navigation solution, namely, the GPS estimated position of the receiver unit. Currently, RAIM may generate several numbers, including, a horizontal position error bound value (sometimes referred to as HIL—Horizontal Integrity Limit), a vertical position error bound value (sometimes referred to as VIL—Vertical Integrity Limit), and spherical position error bound for the current time, i.e., the instance of time that GPS measurements occurred.

Once calculated, the position error bound value(s), HIL and/or VIL, may be compared with selectable integrity alarm limit values to determine if the pilot can rely on the derived GPS estimated position for the current phase of the light mission. It should be recognized that some interpretation may be required dependent upon the GPS receiver's ability to simultaneously receive a plurality of satellite information signals as is well-understood in the art. However, advancements in the art of 12-channel GPS receivers have made it no longer necessary to rely on interpolation of data as before.

The allowable integrity alarm limit values may change depending upon the phase of the flight mission. For instance, if a pilot is flying in the terminal phase, the integrity alarm limit may be less stringent than if the pilot is in the approach phase of the flight mission. If the pilot is to transition from the terminal phase to the approach phase, the pilot needs to know whether the current position error bound is sufficient to allow the pilot to rely upon the GPS solution to make the transition.

As is well understood in the art, inertial reference systems employ a plurality of inertial sensors, for example, gyroscopes and accelerometers, for determining an IRS estimated position of the aircraft, hereinafter referred to as "POS_IRS". Generally, the IRS estimated position is in terms of latitude and longitude (altitude being separately determined by other means such as an altimeter of some type). However, inherent in such inertial sensors are particular bias and drift terms which affect the accuracy of the IRS estimated position of the aircraft utilizing solely an inertial reference system. Since high inertial grade sensors, i.e., low bias and drift characteristics, are very costly, it is desirable to minimize the cost of the IRS system by using lower grade inertial sensors.

In the art, a compromise has been reached by using lower grade inertial reference systems in combination with a global positioning system to produce a high quality--lower cost navigation and flight control system. This is sometimes referred to as a Hybrid INS/GPS or IRS/GPS Inertial Reference System. These systems achieve excellent results since low grade inertial reference systems produce very accurate dynamic response characteristics, whereas, GPS provides very accurate static position information, but less accurate dynamic response information. Combining both the IRS estimated position and inertial reference information with GPS estimated position information provides excellent user position information for flight navigation and flight control applications. Accordingly, a flight management system (FMS), combines the excellent features of both the IRS and the GPS systems to provide position and inertial reference information which permits excellent flight management, flight control and navigation.

An example of a hybrid IRS/GPS system is Honeywell Inc.'s "Global Positioning Inertial Reference Unit (GPIRU) identified as an HG 1050 AG01 which is referred to as a "hybrid" system since it provides position and inertial information which are a resultant combination of GPS and inertial reference system information. The GPIRU includes an inertial reference unit with gyros and accelerometers to provide information about aircraft attitude and rate of change of position as well as providing a first source of position information. The GPIRU also receives inputs from a Global Position System Receiver to provide a second and independent source of information about the aircraft position. The two sets of information are mathematically combined in a Flight Management System (FMS) to determine a hybrid position POS_HYB. In turn, this position value along with attitude and rate signals from the Inertial Reference Unit may be provided in a flight control for controlling aircraft.

A problem, however, with flight management systems employing GPS and IRS is the questionable integrity of the GPS estimated position information during those times in which RAIM integrity limit values are no longer available, i.e. insufficient satellite information to provide useful integrity position error bound values.

BRIEF DESCRIPTION OF THE INVENTION

The present invention uses the FMS to calculate a poisition error at anytime, t, after the loss of integrity at time, $T_L$, by utilizing the GPS values for position and velocity at time $T_L$ just before loss of integrity and by utilizing the IRS position modified by the known error in IRS position as it varies with time and the position error as calculated by the GPS velocity extrapolated over the time $(t-T_L)$.

DESCRIPTION OF THE PREFERRED EMBODIMENT

Figure 1:
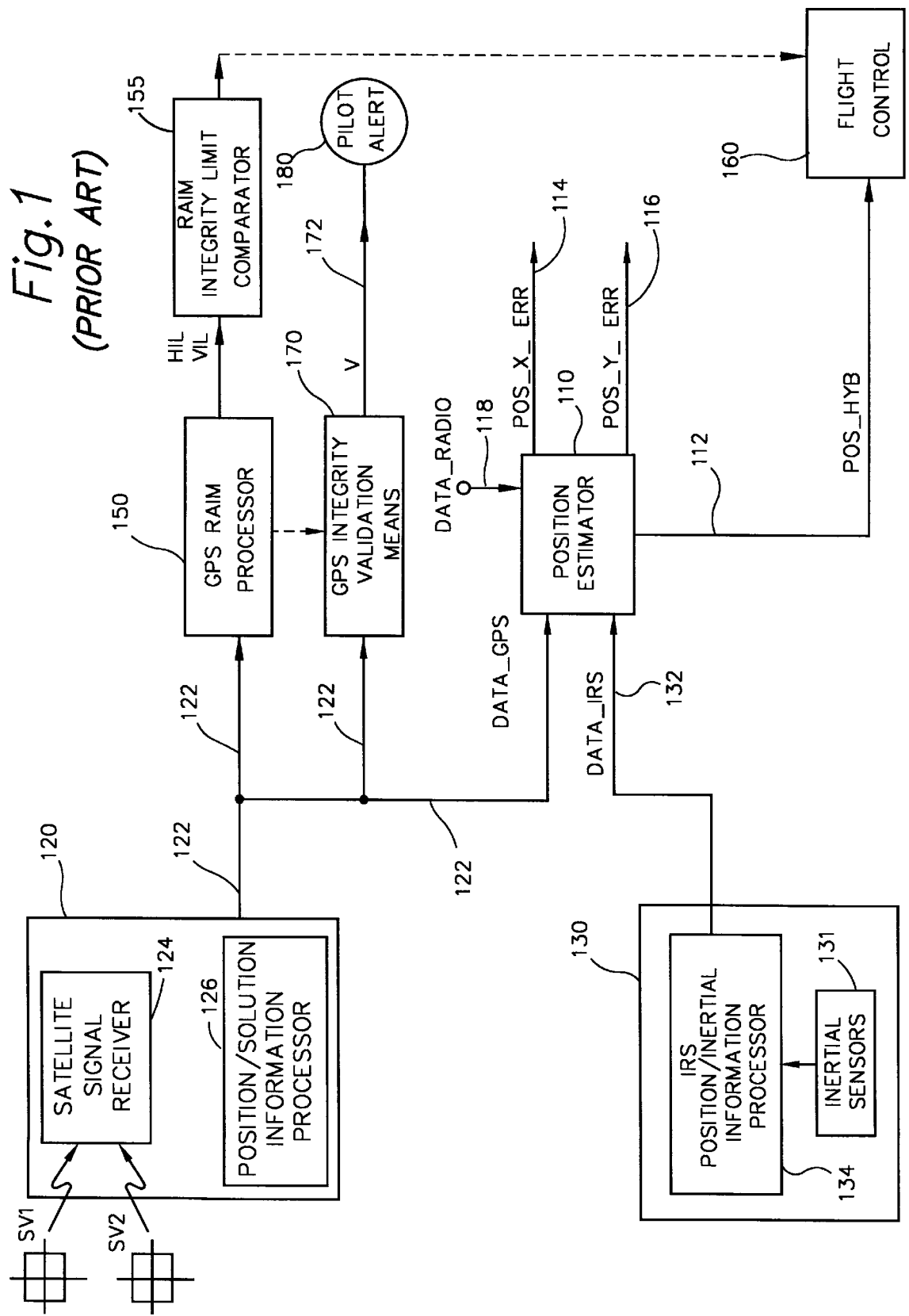
FIG. 1 is a combined inertial reference system and a satellite positioning system known in the prior art.

Illustrated in FIG. 1 is a simplified block diagram of a mobile unit, a hybrid IRS/GPS estimator commonly employed on aircraft. A position estimator 110, for example, as part of a flight management system as described earlier, receives as inputs (i) GPS output information identified as DATA_GPS, further identified by numeral 122, from a satellite positioning system receiver 120, and (ii) an inertial reference output information indicated by DATA_IRS, further identified by numeral 132 from inertial reference system 130. Position estimator 110 processes DATA_IRS and DATA_GPS to derive (i) a hybrid position estimate identified as POS_HYB, and position error estimates identified as POS_X_ERR and POS_Y_ERR. This information, which will be described in detail below, is provided on output signal lines 112, 114, and 116 respectively.

As is well-understood in the art, satellite positioning system receiver 120 includes a satellite signal receiver portion 124 for receiving satellite information signals from a plurality of satellite vehicles, for example, SV1 and SV2, which form, in part, a constellation of satellite vehicles. One example, already indicated, is the NAVSTAR GPS constellation of satellites. In turn, the satellite information signals are operated on by GPS position/solution information processor 126 for providing a GPS solution information identified as DATA_GPS on signal line 122. This information is provided as an input to position estimator 110, to a GPS integrity validation means 170 and to a GPS RAIM processor 150 on common signal line 122.

Inertial reference system 130 includes a plurality of inertial sensors indicated by block 131 as inputs to an IRS position/inertial information processor 134 for providing IRS derived position and inertial information on signal line 132, designated DATA_IRS. This information is provided as an input to position estimator 110.

Position estimator 110, which forms in part a flight management system known in the art, utilizes the GPS solution information, DATA_GPS, as a continuous reference for enhancing the accuracy of the IRS position/inertial information DATA_IRS, particularly for minimizing resultant bias terms which are inherent in the inertial sensors 131. Position estimator 110 may also include an input for receiving radio position information indicated by numeral 118, e.g. VOR signal information designated as DATA_RADIO.

Position estimator 110 provides as an output on signal line 112 an estimated position identified as POS_HYB. The output POS_HYB of position estimator 110 is provided as an input to flight control block 160, useful for deriving aircraft flight control signals to achieve a desired aircraft position. For example, flight control 160 may be employed for en-route navigation, terminal approach, and landing of an aircraft.

Before proceeding, it should be noted, as commonly understood in the art, that position estimator 110 employs filtering techniques, such as second order filters or Kalman filters for deriving the aforesaid output information. The position error estimates POS_X_ERR and POS_Y_ERR represent the latitude and longitude errors which are related to the differences between the GPS derived position identified as POS_GPS and the inertial reference system derived position identified as POS_IRS associated with DATA_GPS and DATA_IRS, respectively.

Further, it should be noted that associated with outputs DATA_GPS, DATA_IRS, POS_HYB, POS_X_ERR, and POS_Y_ERR are discrete time values. Accordingly, system timing (not shown) and/or interpolation or extrapolation functions are, of course required, so that position estimator 110 combines the GPS and IRS information for substantially the same time values. In the following exposition, synchronization of time values should be assumed and that each value has a discrete time associated therewith.

As is well-understood in the art, the GPS position solution information must be validated by a GPS system integrity monitor. GPS RAIM processor 150 is intended to operate on the GPS solution information DATA_GPS for determining at least horizontal integrity limit values HIL, and may also provide vertical integrity limit values VIL. In turn, these integrity limit values are compared in RAIM Integrity Limit Comparator 155 with selected integrity alarm limit values dependent upon the phase of the flight mission. In turn, if HIL/VIL is acceptable, the pilot will allow control of the aircraft based upon the outputs of position estimator 110. On the other hand, if HIL/VIL exceeds the integrity alarm limit values, the pilot must be alerted so that corrective action may be taken.

A second scenario is, of course, the case where RAIM is unavailable, i.e., insufficient number of tracked satellites. In this scenario, the constellation of satellites as observed by the GPS receiver 120 may be such that it is impossible for GPS RAIM processor 150 to arrive at a solution for obtaining HIL and/or VIL integrity limit values—these being resultant large values for HIL/VIL. Accordingly, GPS integrity validation means 170 is employed to provide an indication as to whether or not there exists RAIM integrity monitoring availability, i.e., sufficient satellite information signals to be able to calculate the integrity limit values, HIL and/or VIL. As illustrated in FIG. 1, GPS integrity validation means 170 receives as its input the GPS receiver output on signal line 122 for making such determination, i.e. RAIM integrity monitoring available or not available, and providing such indication as signal "V" on signal line 172.

As is well understood in the art, GPS integrity validation means 170 represents a simple analysis of the number of satellite information signals tracked by the GPS signal receiver 120 which meet predetermined criteria, e.g., elevation angle. As described earlier, RAIM availability is conditioned upon having at least five satellites tracked for receiving satellite information therefrom. Secondly, GPS RAIM processor 150 is generally operable not to utilize satellite information from those satellites which are less than a selected elevation angle. In this situation, even though a proper number of satellites have been tracked, the information may not be reliable due to the elevation angle of the satellite relative to the user's position. In either case, the function of GPS integrity validation means 170 is to provide an indication of the "non-availability" of RAIM integrity limit values, and is provided as an input to a pilot alert mechanisms indicated by block 180.

It should be noted that blocks 150, 155, and 170 are shown as discrete functional blocks, for explanation purposes. However, it should be understood that they may be incorporated together, and may also be part of the GPS receiver, itself, as should be appreciated by those skilled in the art.

Reliance upon the system as described in FIG. 1 by a pilot is extremely dependent upon RAIM availability. In other words, the user position estimate POS_HYB is only useful during those times in which RAIM integrity limit values are available. Loss of RAIM will have adverse consequences, for example, requiring the pilot to abort a terminal approach or landing.

For example, consider the situation in which RAIM is available and an aircraft has already begun the terminal phase of the flight mission prior to landing. Assume now that during this phase of the flight mission that the constellation of satellites changes to a condition in which RAIM integrity monitoring is no longer available. In this scenario, the pilot is alerted via a warning display mechanization 180 or inputs to the flight control system 160 such as to cause the pilot to disengage the flight control system which responds primarily to the aircraft position POS_HYB since GPS data may no longer be reliable. In this scenario, depending upon the weather conditions, namely, cloud cover and the like, the pilot must determine whether to manually fly the aircraft, or abort the phase of the flight mission in which RAIM integrity monitoring was lost, i.e., not available. In the latter case, the pilot may take appropriate actions to require some delay time at which the constellation of satellites would be in proper position to provide RAIM integrity monitoring availability.

It should be noted, one technique for avoiding the above scenario, is predictive RAIM. Predictive RAIM attempts to known in advance that RAIM integrity monitoring is available before entering a particular phase of the flight and would be available throughout the entirety of the phase of the flight mission. This is particularly important in the approach and landing phases of the flight mission. If predictive RAIM indicates "non-availability", the pilot may take certain actions, e.g., decrease the aircraft velocity such that landing takes place at a later time when RAIM is once again available.

Figure 2:
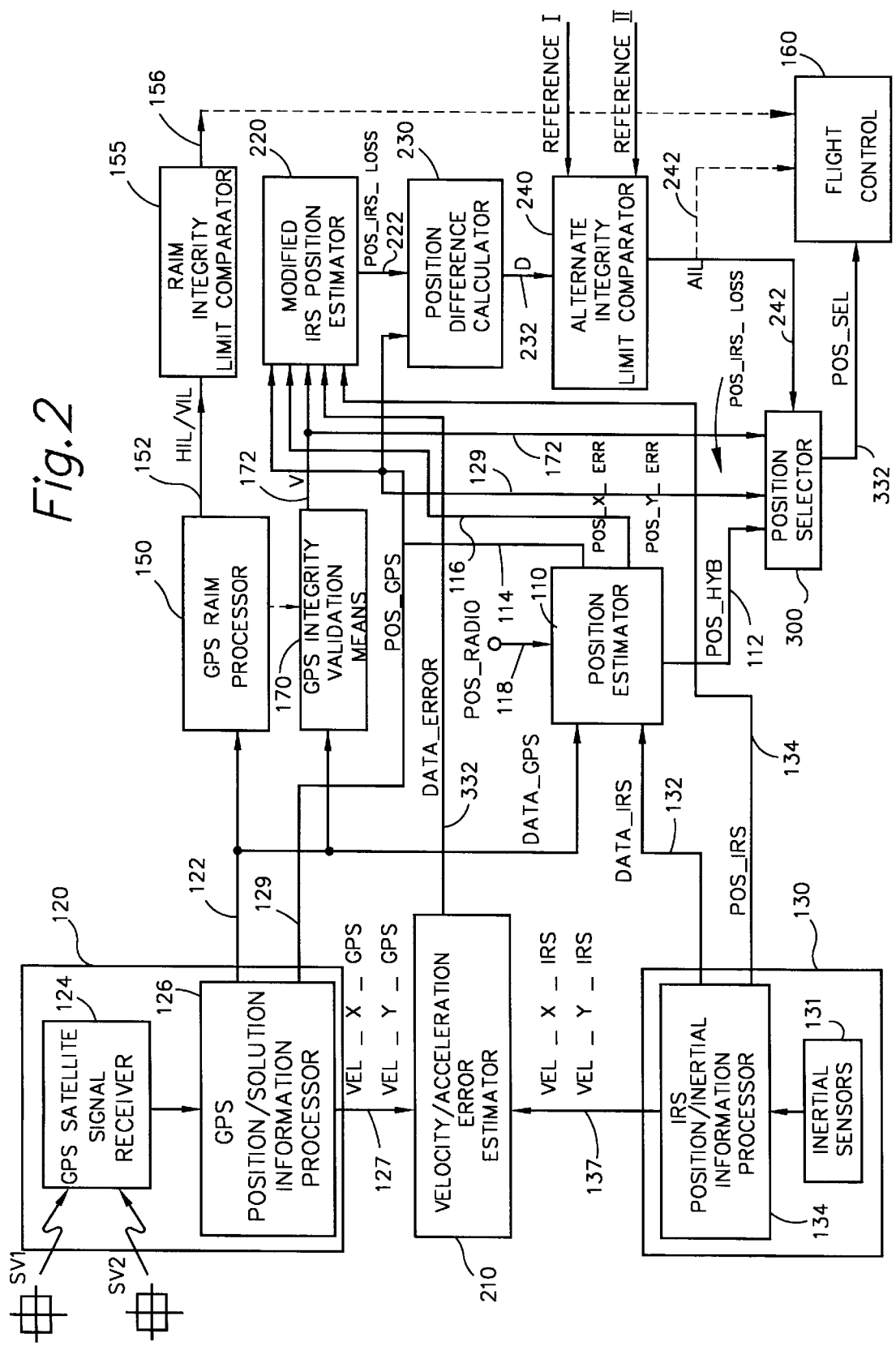
FIG. 2 is a combined inertial reference system and satellite positioning system in accordance with the present invention.

Illustrated in FIG. 2 is one embodiment of the present invention for providing an alternate GPS integrity limit process during those time periods in which the usual RAIM integrity monitoring is not available. In FIG. 2, similar functioning blocks as those illustrated in FIG. 1 have retained the same numeral designation, and therefore will not be further described. FIG. 2, in addition to those components as shown in FIG. 1, further includes velocity/acceleration error estimator 210, modified IRS position estimator 220, position difference calculator 230, alternate integrity limit comparator 240, and position selector 300.

Before proceeding, it should be understood that GPS position/inertial information processors may provide position/inertial information in a variety of coordinate reference frames. Commonly, GPS information provides position information in an earth-centered, earth-fixed, coordinate reference frame. In turn, this information may be translated into latitude and longitude values. The inertial GPS solution information may include velocity information in terms of north direction and east direction, as is commonly found in the art. These values, of course, are mere translations and/or transformations of the earth-centered, earth-fixed, position information. Accordingly, as depicted in FIG. 2 and the explanation which follows, north and east directions are represented by X and Y, respectively, which also relates to latitude and longitude, respectively. Further, in the following exposition, the term "POS" represents position, and the term "VEL" represents velocity.

Referring again to FIG. 2, velocity/acceleration error estimator 210 receives as inputs (i) GPS derived velocity information in the X and Y direction, and (ii) IRS velocity information in the X and Y direction derived from the inertial sensors, are provided as inputs. These terms may be represented by:

| | |
|---|---|
| VEL_X_GPS | GPS derived velocity, X direction |
| VEL_Y_GPS | GPS derived velocity, Y direction |
| VEL_X_IRS | IRS derived velocity, X direction |
| VEL_Y_GPS | IRS derived velocity, Y direction | where the IRS and GPS designate refers to data derived from the inertial reference system 130 and the GPS receiver 120 respectively. As before, these terms have substantially identical corresponding real time values associated therewith.

Velocity/acceleration error estimator 210 provides as an output information designated as "DATA_ERROR" which represents discrete acceleration and velocity error, or bias terms in the IRS position/inertial information. Such terms may be represented by VEL_X_ERR, VEL_Y_ERR, ACC_X_ERR, and ACC_Y_ERR, X and Y velocity and acceleration errors, respectively. Modified IRS position estimator 220 receives as inputs DATA_ERROR, the inertial reference system 130 position information represented by POS_IRS, the position errors POS_X_ERR and POS_Y_ERR, and validation signal on signal lines 332, 134, 114, 116, and 172, respectively.

Modified IRS position estimator 220 is intended to provide an output on signal line 222 representative of a modified IRS position estimate designated as POS_IRS_LOSS which represents an estimate of the real position of the user during the time period in which GPS RAIM integrity monitoring was not available (i.e., RAIM "LOSS") following a time period when RAIM integrity monitoring was available. Modified IRS position estimator 220 is intended to operate on the aforesaid input information for determining a position estimate which may be mathematically described as follows:

$$POS\_IRS\_LOSS(t) = [POS\_IRS(t)] -$$
$$[POS\_ERR[to] + [VEL\_ERR(to)][t - T_L] + [.5][ACC\_ERR(to)]][t - t_L]^2$$

These terms, of course, having their coordinate components, i.e. X and Y. The above expression is simply a statement that the modified IRS estimated position POS_IRS_LOSS at time "t" is the measured IRS position POS_IRS(t) corrected by the velocity and acceleration error terms provided by Velocity/Acceleration error estimator 300 and the position error estimates provided as an output of position estimator 110—the latter being provided by a filtered error estimator described earlier.

In component terms, then $$D = R_E * \sqrt{(P_1^x - P_2^x)^2 + (P_1^y - P_2^y)^2 * \cos(LATV)}$$

where
$x, y$ = latitude, longitude, position coordinates
$P_1^x$ = POS_X_GPS
$P_1^y$ = POS_Y_GPS
$P_2^x$ = POS_Y_IRS
$P_2^y$ = POS_Y_IRS
$LATV = \dfrac{P_1^x + P_2^x}{2}$
$RE$ = Earth Radius at $LATAV$ Again referring to FIG. 2, the modified IRS position estimate identified as POS_IRS_LOSS provided on output signal line 222 is presented to position difference calculator 230. Position difference calculator 230 receives as a second input the GPS derived position identified as POS_GPS provided on output signal line 129 from GPS receiver 120. Position difference calculator 230 is intended to derive the difference in position D between the GPS derived position and the modified IRS position estimate, as mathematically described by:

$$D = R_E * \sqrt{(P_1^x - P_2^x)^2 + (P_1^y - P_2^y)^2 * \cos(LATV)}$$

where
$x, y$ = latitude, longitude, position coordinates
$P_1^x$ = POS_X_GPS
$P_1^y$ = POS_Y_GPS
$P_2^x$ = POS_Y_IRS
$P_2^y$ = POS_Y_IRS
$LATV = \dfrac{P_1^x + P_2^x}{2}$
$RE$ = Earth Radius at $LATAV$ It should be noted that the position difference "D" represents the magnitude of a vector between (a) the position coordinates derived from the GPS solution provided by GPS receiver 120, and (b) the position coordinates derived by the IRS position/inertial information processor 134 as modified by the velocity/acceleration errors DATA_ERROR provided as an output of modified IRS position estimator 220, namely POS_IRS_LOSS. The value "D" represents an "alternate integrity limit" value since it relates to the errors in the IRS system 130 at the time RAIM integrity monitoring was lost. The value D is provided as an output on signal line 232, and presented as an input to alternate integrity limit comparator 240.

Alternate integrity limit comparator 240 receives as inputs the alternate integrity limit value D, and integrity alarm limit reference values identified as reference-I and reference-II, dependent upon the phase of the flight mission. Alternate integrity limit comparator 240 is intended to compare the deviation between the alternate integrity value D and a predetermined flight phase integrity alarm limit value (i.e., the alarm limit reference values). The aforesaid integrity alarm limit value is of course dependent upon the phase of the flight mission (for example, terminal phase, approach phase, or final approach (landing) phase). Alternate integrity limit comparator 240 provides an indication of the alternate integrity comparison designated AIL on signal line 242. In turn, output signal line 242 is presented as an input to position selector 300, and flight control 160.

Position selector 300 receives as inputs, the position estimator 110 derived position POS_HYB on signal line 112, and the GPS derived position POS_GPS from GPS receiver 120 on output signal line 129. Further, position selector 300 receives as an input, the output V provided by GPS integrity validation means 170, and the output AIL from alternate integrity limit comparator 240 on signal lines 172 and 242. Position selector 300 provides as an output on signal line 332 an estimated position identified as POS_SEL dependent upon the output of GPS integrity validation means 170, the alternate integrity limit comparator 240, and the position inputs as aforesaid. This signal is presented to flight control 160.

Operation of the embodiment of the invention depicted in FIG. 2 will now be described.

RAIM Available

Consider the situation in which an aircraft is in the terminal phase of the flight mission, and the constellation of GPS satellites is such the GPS receiver 120 is able to track five or more satellites which have an elevation angles greater than some selected minimum. In these circumstances, GPS RAIM processor 150 receiving the GPS position/solution information, is able to calculate the horizontal integrity limit value HIL. Secondly, GPS integrity validation means 170 outputs V indicating that RAIM is available.

At the same time, position estimator 110 derives an estimated aircraft position POS_HYB as a function of the GPS data, identified as DATA_GPS and the IRS data, identified as DATA_IRS to calculate the estimated position POS_HYB by a matter well-known in the art as already described with reference to FIG. 1. Upon receiving a RAIM available signal indication on signal line 172, position selector 300 sets the output 332 such that POS_SEL=POS_HYB. This estimated position, POS_SEL, is provided as an output to flight control 160. In turn, flight control 160 will utilize the estimated aircraft position POS_SEL if, and only if, the integrity limit value HIL is below a preselected value. Accordingly, flight control 160 includes pilot alarms, navigation, and flight control processing functions as well-known in the art.

RAIM Changes to Non-Availability

Now consider the situation when the GPS constellation is such that RAIM integrity monitoring is no longer available at time $T_L$. In these circumstances, modified IRS position estimator 220 (i) acknowledges the fact that RAIM is no longer available, (ii) stores the value of $T_L$, (iii) stores the velocity/acceleration error estimates presented by DATA_ERROR corresponding to time $T_L$, and (iv) calculates the modified IRS position POS_IRS_LOSS for time after $T_L$ and until RAIM becomes available again.

In these circumstances, position selector 300 sets POS_SEL=POS_IRS_LOSS. Concurrently, the difference D between the modified IRS position estimate POS_IRS_LOSS differential and the GPS position solution GPS_POS is calculated by position difference calculator 230. Alternate integrity limit comparator 240 compares the output value D with the flight phase alarm limit reference values corresponding to the particular phase of flight. If D is greater than the acceptable limit value reference, the output AIL of alternate integrity limit comparator 240 provides a go/no go indication, AIL, as an input to flight control 160. In these circumstances, the estimated position indicated by POS_SEL should not be used for flight control, and that the pilot needs to take corrective action as being appropriate.

RAIM Returns to Available

Upon the GPS satellite constellation changing to a condition at which RAIM is now available, position selector 300 will set its output POS_SEL to POS_HYB as before.

Figure 3:
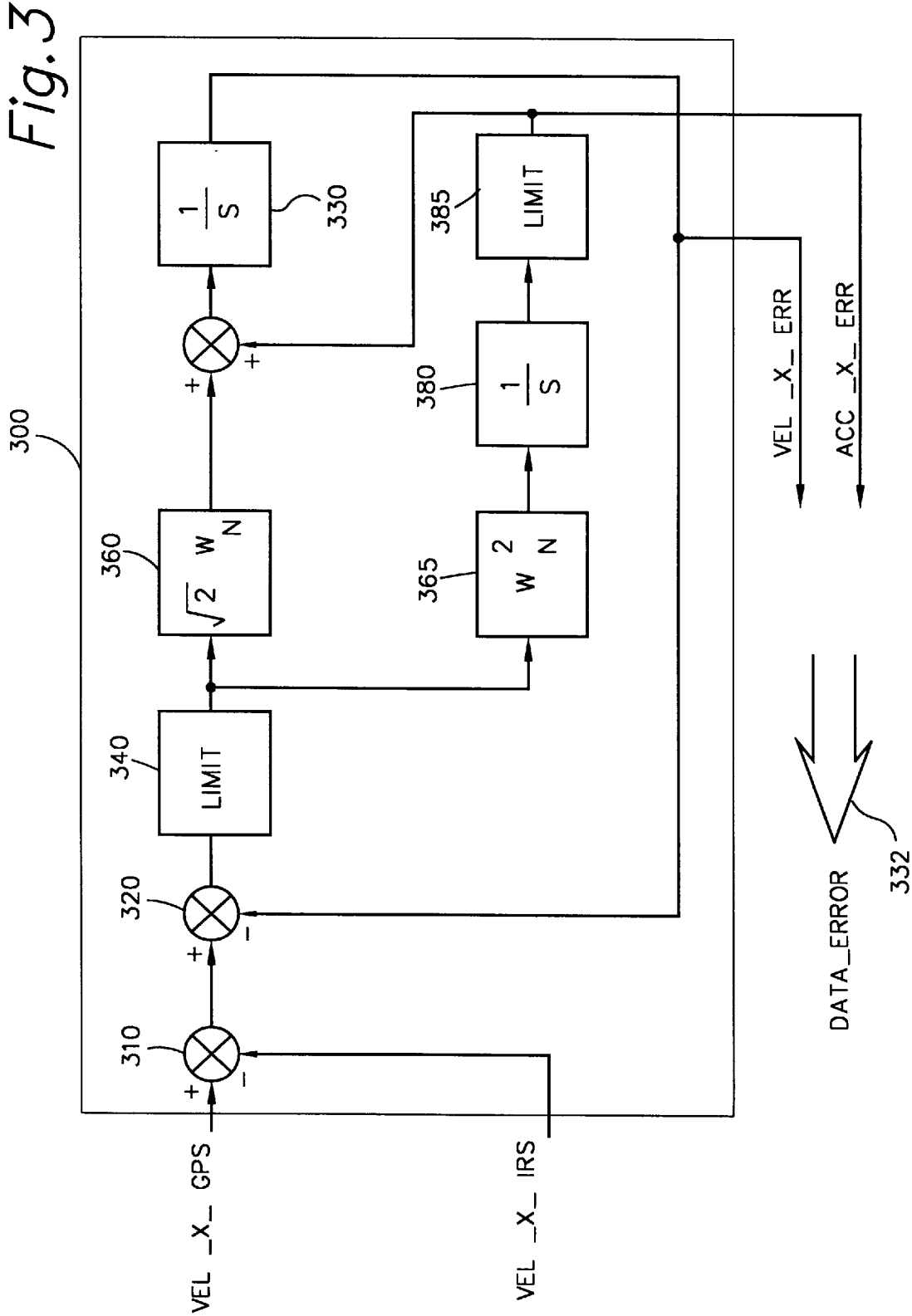
FIG. 3 is a block diagram illustrating a second order filter.

FIG. 3 illustrates one embodiment of a velocity/acceleration error estimator 210 in the form of a second order filter. The nomenclature shown in FIG. 3 is for the "X" direction, and a similar implementation is required for the "Y" direction. Thereshown is block 310 for forming the difference calculations between the GPS derived velocity value and the IRS derived velocity value for the X direction as identified by: VEL_X_GPS, and VEL_X_IRS, respectively.

In turn, block 320 forms the difference between the output of block 310 and the velocity error term VEL_X_ERR. The filter further includes integrator 330 and integrator 380, value limiters 340 and 385, and gain blocks 360 and 365.

As illustrated, the acceleration error term "ACC_X_ERR" is equal to the output of limiter block 340 multiplied by gain block 365, integrated by integrator 380, and subsequently being passed through limit block 385. The velocity error term VEL_X_ERR being substantially equal to the output of limit block 340 passing through gain block 360 and summed with the acceleration error term ACC_X_ERR before being integrated by block 330, forming the velocity error term.

The foregoing description of the present invention has been described in terms of simplified schematic block diagrams where each one of the blocks generally employs complex systems employing specific software for executing complex mathematical functions for deriving the intended information. It should be recognized that these schematic block diagrams particularly illustrated in the Figures may be configured by employment of many electronic subsystems, computers and software/firmware implementations. The signal lines, shown in singular form, may represent one or more data buses for providing the intended information as should be appreciated by those skilled in the art. Further, as is well-understood in the art, a single electronic/software subsystem may be employed for performing the appropriate calculations for the generation of all of the described data, except for the details of the GPS signal receiver for receiving the GPS satellite information signals, as well as the inertial sensors themselves. All of these variations as just described are intended to be within the true spirit and scope of the present invention.

Although the present invention has particular applicability to flight control for aircraft or spacecraft, and the like, it is intended to be within the true spirit and scope of the present invention for applications beyond that of flight control.

Lastly, although the velocity and acceleration error estimator has been illustrated by employment of a simple second order filter, other filters are within the scope of the present invention, for example a six or nine state Kalman filter to include the funciton of block 130.

By way of the Figures illustrated herein, a technique has been disclosed for estimating the velocity and acceleration errors of an inertial reference system by processing GPS derived velocity information and IRS derived velocity information in a second order filter for a subsequent determination of an IRS derived user position modified by the aforesaid velocity and acceleration errors. The error estimates are frozen at a time when the GPS satellite information signals are sufficient to provide a RAIM integrity. However, when the RAIM integrity information is not available, but the GPS position solution had been deemed to have adequate accuracy prior to loss of RAIM availability, a real time IRS user position is modified with these estimated velocity and acceleration errors to provide a highly reliable user position in the absence of RAIM integrity. In turn, an alternate integrity limit value is established, that value being the magnitude of difference between the current GPS position POS_GPS and the modified IRS position estimate, POS_IRS_LOSS.

The IRS position POS_IRS modified by the velocity and acceleration error estimates IRS_POS_LOSS is based on an assumed inertial reference system error model. This model reflects accurately the fact, that in the short term, the inertial reference system performance is governed by the velocity errors. In the absence of any calibration of these errors, the logical practice is to assume their specification limits. For this reason, the 99.9 percentile value assumed for the position error growth rate can be as high as 12 nautical miles per hour. This value, when used in IRS based alternate integrity computations, reaches an alarm limit of 0.3 nautical miles (typical for approach phase of the mission) in 1.5 minutes. But, in accordance with the present invention, the estimated velocity errors correct the IRS velocities, thereby reducing the value of any residual errors. Further, the accuracy of the alternate user position, POS_IRS_LOSS made using both velocity and acceleration error estimates, is considerably enhanced. It is believed that the residual errors in the computations are at most of the order of 3 nautical miles per hour on a 99.9 percentile basis. At this rate, alarm limits of 0.3 nautical miles will be reached in six minutes, a four-fold improvement over current implementations.

The embodiments of an invention in which an exclusive property or right is claimed are defined as follows:

1. A combined inertial reference system and a satellite positioning system for determining user position comprising:

an inertial reference system employing inertial sensors for providing IRS position and inertial reference information, including IRS velocity information, derived from output information from said inertial sensors;

a satellite positioning system receiver for providing a GPS position solution including a resultant GPS position and resultant GPS velocity information derived form satellite information from signals transmitted from a plurality of satellites;

validation means responsive to at least the number of said plurality of satellites transmitting said satellite information signals for indicating a non-availability time period when said number is below that which is required to provide at least one integrity limit value associated with the accuracy of said GPS solution, as opposed to an integrity time period when said number is sufficient to provide said at least one integrity limit value;

error estimator means for determining velocity and acceleration error estimates associated with said IRS inertial information as a function of said IRS velocity information and said resultant GPS velocity information;

coast position estimator means for determining a first estimated position of the user's position during said non-availability time period as function of said velocity and acceleration error estimates occurring at the beginning of said non-availability time period, the elapsed time accumulated since the beginning of said non-availability time period, and the IRS position.

2. The combined inertial reference system and a satellite positioning system of claim 1 further comprising:

IRS/GPS position solution determining means for determining a second estimated position of the user's position as a function of a t least said IRS position and inertial information and said resultant GPS position and resultant GPS velocity information;

position selector means for providing as an output thereof said second estimated position for time during an integrity time period, and said first estimated position for time during a non-availability time period.

3. The combined inertial reference system and a satellite positioning system of claim 1 wherein said error estimator means provides a second order filter having as it input the difference between corresponding components of said resultant GPS velocity and said IRS velocity.

4. The combined inertial reference system and a satellite positioning system of claim 3 wherein said error estimator means includes (i) a second order filter having as its input the difference between north direction components of said resultant GPS velocity and said IRS velocity, and as outputs corresponding north direction velocity and acceleration bias values, and (ii) a second order filter having as it input the difference between east direction components of said resultant GPS velocity and said IRS velocity, and as outputs the corresponding east direction velocity and acceleration bias values.

5. An apparatus for determining the position of a vehicle, the apparatus comprising:

a global positioning system (GPS) communicating with a plurality of satellites and providing a GPS position signal;

an inertial reference system (IRS) providing an IRS position signal;

a position estimator providing a hybrid position signal based upon th eGPS position signal and the IRS position signal;

an IRS position estimator providing an estimated IRS position signal based upon the IRS position signal, the velocity of the vehicle, and the acceleration of the vehicle; and a position selector providing a vehicle position signal, wherein the vehicle position signal corresponds to the hybrid position signal when the GPS position signal is reliable, and wherein the vehicle position signal corresponds to the estimated IRS position signal when the GPS position signal is unreliable.

6. The apparatus of claim 5 wherein the GPS position signal is unreliable when receiver autonomous integrity module (RAIM) information is unavailable from the global positioning system.

7. The apparatus of claim 5 wherein the GPS position signal is unreliable when the global positioning system communicates with fewer than five satellites.

8. The apparatus of claim 5 further comprising a RAIM availability module that receives the GPS position signal and provides a RAIM availability signal to the position selector.

9. The apparatus of claim 5 further comprising a RAIM availability module that receives the GPS position signal and provides a RAIM availability signal to the IRS position estimator.

10. The apparatus of claim 5 further comprising a velocity/acceleration error estimator that receives a GPS velocity based upon the velocity of the vehicle from the global positioning system and provides a data error signal to the IRS position estimator.

11. The apparatus of claim 5 further comprising a velocity/acceleration error estimator that receives an IRS velocity based upon the velocity of the vehicle from the inertial reference system and provides a data error signal to the IRS position estimator.

12. The apparatus of claim 10 further comprising a velocity/acceleration error estimator that receives an IRS velocity based upon the velocity of the vehicle from the inertial reference system.

13. The apparatus of claim 11 wherein the velocity/acceleration error estimator comprises a second order filter.

14. The apparatus of claim 12 wherein the velocity/acceleration error estimator comprises a second order filter.

15. A method of determining the position of a vehicle having a velocity and an acceleration, the method comprising the steps of:

providing a GPS position signal from a global positioning system;

providing an IRS position signal from an inertial navigation system;

determining if the GPS position signal is reliable;

providing a hybrid position signal to a flight control when the GPS position signal is reliable, the hybrid position signal being based upon the GPS position signal and the IRS position signal; and providing an estimated IRS position signal to a flight control when the GPS position signal is unreliable, the estimated IRS position signal being based upon the velocity of the vehicle, the acceleration of the vehicle and the IRS position signal.

16. The method of claim 15 wherein the velocity of the vehicle and the acceleration of the vehicle are monitored by the global positioning system.

17. The method of claim 15 wherein the velocity of the vehicle and the acceleration of the vehicle are monitored by the inertial reference system.

18. The method of claim 16 wherein the velocity of the vehicle and the acceleration of the vehicle are monitored by the inertial reference system.

19. The method of claim 15 further comprising the steps of:

determining if the estimated IRS position signal is reliable; and providing an indication to a pilot of the vehicle if the estimated IRS position signal is not reliable.

* * * * *